(12) United States Patent
Frentz et al.

(10) Patent No.: US 6,557,951 B1
(45) Date of Patent: May 6, 2003

(54) BRAKE SYSTEM WITH HYDRAULIC BRAKE BOOSTER AND CORRESPONDING METHOD

(75) Inventors: Georg Frentz, Nuertingen (DE); Peter Woll, Bruchsal (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/889,832
(22) PCT Filed: Dec. 9, 1999
(86) PCT No.: PCT/EP99/09704
§ 371 (c)(1),
(2), (4) Date: Oct. 22, 2001
(87) PCT Pub. No.: WO00/43246
PCT Pub. Date: Jul. 27, 2000

(30) Foreign Application Priority Data

Jan. 22, 1999 (DE) .......................................... 199 02 444

(51) Int. Cl.⁷ ................................................. B60T 8/42
(52) U.S. Cl. .......................... 303/115.2; 303/3; 303/15; 303/122.09; 303/113.4
(58) Field of Search .............................. 303/3, 15, 122, 303/122.04, 122.09, 122.12, 113.4, 114.1, 115.1, 115.2, 115.4, 116.1, 116.2, 22.4

(56) References Cited

U.S. PATENT DOCUMENTS 4,708,404 A * 11/1987 Seibert et al. .............. 188/345
4,730,877 A * 3/1988 Seibert et al. .............. 188/358
4,753,490 A * 6/1988 Belart et al. ............. 303/115.4

* cited by examiner

Primary Examiner—Christopher P. Schwartz
Assistant Examiner—Devon Kramer
(74) Attorney, Agent, or Firm—Crowell & Moring LLP

(57) ABSTRACT

A brake system with hydraulic brake boosting has a hydraulic actuating unit which comprises a hydraulic reservoir, a brake pedal, a brake-pressure generator and a pedal-travel simulator, a hydraulic unit comprising a pressure generator, a hydraulic wheel-brake device and a control unit for coordinating the functions of the actuating unit, of the hydraulic unit and of the wheel-brake device. The pedal-travel simulator possesses a variable displacement volume which is connected to the hydraulic reservoir via a hydraulic line.

In order to design electrohydraulic brakes by simple means so as to be more fail-safe, a return line is provided between the wheel-brake device and the displacement volume of the pedal-travel simulator. Moreover, there is arranged in the hydraulic line, between the hydraulic reservoir and the displacement volume of the pedal-travel simulator, a return-flow valve which in the event of a fault, with the brake system defective, can be shifted into a shut-off position blocking the hydraulic line.

10 Claims, 1 Drawing Sheet

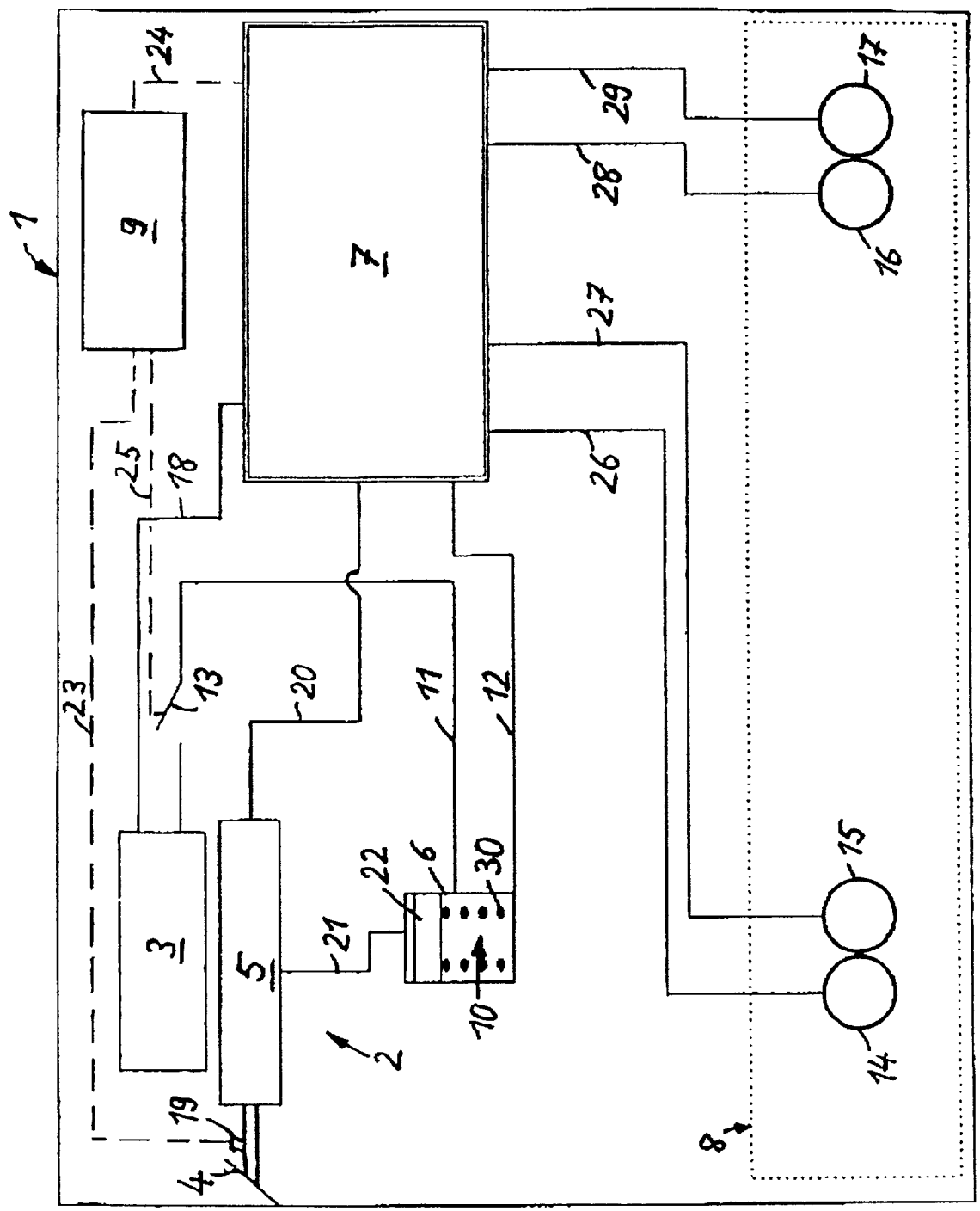

BRAKE SYSTEM WITH HYDRAULIC BRAKE BOOSTER AND CORRESPONDING METHOD

This application claims the priority of PCT International No. PCT/EP099/09704 filed Dec. 9, 1999 and German Patent Document 199 02 444.8, filed Jan. 22, 1999, the disclosures of which are expressly incorporated by reference herein.

BACKGROUND OF THE INVENTION

The present invention relates to a brake system with hydraulic brake boosting and to a process therefor.

DE 35 26 556 A1 discloses such a brake system. The master brake cylinder is connected to the wheel brake device by means of a brake line by way of a multi-position valve. A servo brake pressure supplying device can be connected by way of the multi-position valve and can feed additional brake pressure to the wheel brake device. A branch line branches off from the brake line between the master brake cylinder and the multi-position valve. Said branch line is connected to the pedal travel simulator and then shut off by means of a solenoid valve, when a fault occurs in the brake system, for example in the servo brake pressure supplying device.

The pedal travel simulator is supposed to achieve a meterable brake pedal behavior that is familiar to the driver and to reach a pedal travel distance that is significant during braking.

When a fault occurs, the pedal travel simulator is completely separated with respect to the hydraulic medium. In this respect the hydraulic medium, located in the pedal travel simulator at the time of the separation by means of the solenoid valve, is locked in and is not available for further brake pressure build-up, for example, in the subsequent braking operations.

The DE 35 26 556 A1 discloses a brake system for motor vehicles, which comprises a master cylinder or a brake pressure generator, which is designed as a tandem cylinder and which is actuated by a brake pedal and drives a wheel brake device with pressurized hydraulic medium, delivered to the wheel brake device from a reservoir. Provided is also an auxiliary pressure supply system that comprises a hydraulic pump and an electric motor, actuating the pump. The medium, conveyed by the pump, can be fed to the wheel brake device via a switching valve.

A pressure chamber of the master cylinder, acted upon by the brake pedal, communicates with the pedal travel simulator, which is designed as a cylinder with a displaceable actuating piston. The actuating piston limits, in the cylinder, a displacement volume, which is connected to the reservoir via a hydraulic line.

When the volume of the pressure chamber of the master cylinder is reduced due to the pressure of the brake pedal, the medium flows out of the pressure chamber into the pedal travel simulator and acts on the actuating piston, which is adjusted in the direction of the displacement volume. In so doing, the medium, contained in the displacement volume, escapes into the reservoir. At the same time the pressure in the displacement volume of the pedal travel simulator is used for the dynamic modulation of the brake pressure, which is generated via the motor-operated hydraulic pump of the auxiliary pressure supply system.

In order to provide sufficient brake force in the event of a failure of the power supply, the brake pressure in this kind of system is not generated, in the event of a fault, by means of the auxiliary supply system, but rather directly by means of the master cylinder. It is hereby possible to prevent hazardous situations, which may arise due to a failure of the hydraulic pump, for example as a result of a breakdown in the power supply or a failure of the control unit of the system.

If in brake systems, described above, a fault occurs during a braking operation, in which the brake pedal is already partially depressed, there is the problem that up until the brake pedal stops only the remaining residual pedal travel is available via the master cylinder for the build-up of brake pressure necessary during emergency situations. This pedal travel is reduced, as compared to the non-actuated brake pedal, and, under some circumstances, is not sufficient for generating the necessary brake force. If the brake pedal is already fully depressed at the moment when the fault occurs, no additional brake pressure can be generated at all by way of the master cylinder.

SUMMARY OF THE INVENTION

An object of the present invention is to provide electro-hydraulic brakes with simple construction so as to be more fail safe.

This object has been achieved according to the present invention by the brake system and process described herein.

More specifically, a return line is arranged in the hydraulic path between the wheel brake device and the displacement volume of the pedal travel simulator. After the end of the braking operation, said return line conveys the hydraulic medium out of the wheel brake device normally first into the displacement volume and then by means of another hydraulic line back into the reservoir. The hydraulic line between the displacement volume and the reservoir has a return flow valve, which can be adjusted between an opening position, releasing the hydraulic line, and a shut-off position, closing the hydraulic line. Normally the return flow valve is in the open position so that the hydraulic medium flows out of the wheel brake device into the reservoir.

In contrast, in the event of a fault, the return flow valve is shifted into the shut-off position so that, although the connection between the wheel brake device and the displacement volume of the pedal travel simulator is still open, the connection between the displacement volume and the reservoir is interrupted and is consequently hydraulically rigid. The result is that in the event of a fault occurring during a braking operation, the energy stored in the wheel brake device causes the hydraulic medium to flow out of the wheel brake device through the return line back into the displacement volume of the pedal travel simulator. Said displacement volume fills with hydraulic medium and increases its volume as a result of the interrupted connection to the reservoir. The result of the increase in volume of the displacement volume is that the brake pedal, connected to the displacement volume, is set in the direction of its initial position so that the brake pedal travel available to the driver is increased automatically. The additional pedal travel can then be utilized for the brake force, which is generated by the driver and which in the event of faults passes as hydraulic brake pressure through to the wheel brake device directly via the actuating and hydraulic unit.

In an advantageous development, the return-flow valve in the line between the displacement volume and the reservoir is capable of being actuated electrically and, in the dead state, to be in a shut-off position blocking the throughflow. This ensures that, in the event of a fault, the displacement volume is always cut off from the reservoir and therefore the medium conveyed back into the displacement volume must collect in the displacement volume and necessarily leads to an expansion of this volume.

BRIEF DESCRIPTION OF THE DRAWINGS

Other objects, advantages and novel features of the present invention will become apparent from the following detailed description of the invention when considered in conjunction with the accompanying drawings, wherein the sole FIGURE is a schematic diagram of the brake system constructed in accordance with the present invention.

DETAILED DESCRIPTION OF THE PREFERRED EMBODIMENTS

The brake system 1 is an electrohydraulic brake and includes an actuating unit 2, a hydraulic unit 7 connected to the actuating unit 2 and a wheel-brake device 8 for the four vehicle wheels 14, 15, 16, 17. The wheel-brake device 8 is supplied with hydraulic medium from the hydraulic unit 7 and has four brake units which are assigned in each case to a vehicle wheel 14 to 17.

The actuating unit 2 includes, in particular, a hydraulic reservoir 3, a brake pedal 4, a brake-pressure transmitter 5 and a pedal-travel simulator 6. The hydraulic reservoir 3 supplies the pedal-travel simulator 6 and the hydraulic unit 7 with hydraulic medium via hydraulic lines 11 and 18. The pedal travel of the brake pedal 4 is recorded by a travel sensor 19; alternatively to a travel sensor, a force sensor may also be provided to measures the pedal pressure exerted on the brake pedal 4 by the driver.

The brake-pressure generator 5 acted upon by the brake pedal 4 is conventionally configured as a hydraulic cylinder, for example as a tandem cylinder, and is connected to the hydraulic unit 7 via a line 20. In the event of faults, with the brake system defective, the pedal pressure of the brake pedal 4 is converted directly into hydraulic brake pressure via the line 20 and is fed to the wheel-brake system 8 via the hydraulic unit 7.

The hydraulic unit 7 includes, in order to generate the brake pressure to the necessary level, a conventional pressure generator, not illustrated, usually an electrically driven hydraulic pump. The hydraulic pressure generated in the hydraulic unit 7 is fed as brake pressure to the brake units of the wheel-brake device 8 for the vehicle wheels 14 to 17 via lines 26 to 29.

The brake-pressure generator 5 is connected to a pedal-travel simulator 6 via a line 21. The pedal-travel simulator 6 performs the function of simulating an elastic, resilient and accurately meterable behavior of the brake pedal 4. The pedal-travel simulator 6 has a hydraulic cylinder with an adjusting piston 22 and of a displacement volume 10 which can be set variably via the adjusting piston 22 as a function of the pedal position of the brake pedal 4. The adjusting piston 22 is loaded by a spring 30 with spring force which urges the adjusting piston 22 into a position which increases the displacement volume 10 and in which the brake pedal 4 assumes its initial position. The displacement volume 10 is connected to the hydraulic unit 7 via a return line 12 and to the reservoir 3 via the hydraulic line 11. An electrically actuable return-flow valve 13 is arranged in the hydraulic line 11. In the sole FIGURE, the electrically actuable return-flow valve 13 is shown in the closed position.

A control unit 9 is provided to control and coordinate the functioning of the individual components of the brake system. In particular, via a control line 23, the unit 9 records measurement signals from the sensor 19 or receives them as input signals and, via a control line 24, transmits output signals to the electric motor in the hydraulic unit 7 or controls the electrical return-flow valve 13 via a control line 25.

In the normal braking mode, with the brake system intact, depending on the design of the sensor 19, the pedal travel or the pedal pressure of the brake pedal 4 is sensed, and the pedal travel or the pedal pressure is fed as an input signal to the control unit 9. A corresponding brake pressure is determined from the pedal travel or from the pedal pressure in the control unit 9 and an output signal corresponding to the brake pressure is fed to the hydraulic unit 7 in order to set the pump motor of the hydraulic pump. The hydraulic medium required is fed to the hydraulic unit 7 from the reservoir 3 via the line 18.

Furthermore, during or after each braking operation, the electrically actuable return-flow valve 13 in the hydraulic line 11 between the pedal-travel simulator 6 and the reservoir 3 is opened. Thereby, after the end of the braking operation, the hydraulic medium stored in the brake units of the wheel-brake device 8 can be led back into the reservoir 3 via the return line 12, the displacement volume 10 of the pedal-travel simulator 6 and the hydraulic line 11. At the same time, the adjusting piston 22 of the simulator 6 is shifted into its initial position by the spring 30, with the result that the brake pedal 4 resumes its initial position again.

The electrically actuable return-flow valve 13 is configured so that, in the dead or non-controlled state, the valve is in the shut-off position, in which the hydraulic line 11 leading to the reservoir 3 is blocked. In order to open the hydraulic line 11, the return-flow valve 13 must be fully operational and must be acted upon by an actuating signal from the control unit 9. If the correct actuating signal for the return-flow valves 13 is not generated in the control unit 9 or if the power supply fails, the return-flow valve 13 cannot be shifted into its opening position allowing the through flow through the hydraulic line 11; the return-flow valve 13 remains in its blocking shut-off position, in which the connection between the pedal-travel simulator 6 and the reservoir is hydraulically rigid.

If a fault occurs in which the control unit 9 fails and/or the power supply to the assemblies to be actuated electrically fails, the return-flow valve 13 cannot be adjusted into the opening position. The result of this, after the end of the braking operation, is that the connection between the displacement volume 10 and the reservoir 3 remains interrupted. The hydraulic medium conveyed to the pedal-travel simulator via the return line 12 as a result of the higher brake pressure of the brake units of the wheel-brake device 8 flows into the displacement volume 10 and, even when the brake pedal is actuated by the driver, causes the brake pedal to be reset into the initial position. If the power or the control unit fails during a braking operation, it is thereby possible to ensure that, by virtue of the resetting of the brake pedal, the entire pedal travel is available again for the emergency braking via the brake-pressure generator 5, the line 20 of the hydraulic unit 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Brake system with hydraulic brake boosting comprising a hydraulic actuating unit having a hydraulic reservoir, a brake pedal, a brake pressure generator and a pedal travel simulator with a variable displacement volume, a hydraulic unit comprising a pressure generator; a hydraulic wheel brake device; and a control unit for operatively coordinating functions of the actuating unit of the hydraulic unit and of the wheel brake device, wherein the wheel brake device is configured for recirculation of the hydraulic medium and is connected to the displacement volume of the pedal travel simulator by a return line, and the displacement volume of the pedal travel simulator is connected to the hydraulic reservoir, by a hydraulic line to recirculate the hydraulic medium out of the wheel brake device back into the hydraulic reservoir by way of the displacement volume of the pedal travel simulator, and the hydraulic line between the hydraulic reservoir and the displacement volume of the pedal travel simulator includes a return flow valve configured, in the event of a fault from a defective brake system, to be shifted into a shut-off position blocking the hydraulic line.

2. Brake system according to claim 1, wherein the return flow valve is configured to be electrically actuateable, whereby, in a dead state, the return flow valve is in the shut-off position.

3. Brake system as claimed in claim 1, wherein the pedal travel simulator is a hydraulic cylinder with a displaceable adjusting piston for variable setting of the displacement volume.

4. Brake system as claimed in claim 3, wherein the return flow valve is configured to be electrically actuateable, whereby, in a dead state, the return flow valve is in the shut-off position.

5. Brake system as claimed in claim 1, wherein the hydraulic unit is arranged in a flow path between the actuating unit and the wheel brake device.

6. Brake system as claimed in claim 5, wherein the return flow valve is configured to be electrically actuateable, whereby, in a dead state, the return flow valve is in the shut-off position.

7. Brake system as claimed in claim 6, wherein the pedal travel simulator is a hydraulic cylinder with a displaceable adjusting piston for variable setting of the displacement volume.

8. Brake system as claimed in claim 5, wherein the return line is arranged between the hydraulic unit and the displacement volume of the pedal travel simulator.

9. Process for boosting brake force in a brake system as claimed in claim 8, comprising converting pedal travel of a brake pedal into a brake pressure that acts upon a wheel brake device, using the pedal travel to influence a displacement volume of a pedal travel simulator; normally, after the end of a braking operation conveying the hydraulic medium out of the wheel brake device by way of a return line into the displacement volume of the pedal travel simulator and out of the displacement volume of the pedal travel simulator via a hydraulic line into a hydraulic reservoir; and, in the event of a fault during a braking operation, interrupting the hydraulic line between the displacement volume and the hydraulic reservoir and collecting the hydraulic medium of the wheel brake device in the displacement volume of the pedal travel simulator.

10. Process as claimed in claim 9, further comprising maintaining an electrically actuable return flow valve in the hydraulic line between the pedal travel simulator and the hydraulic reservoir in a dead state in a shut-off position to block the flow through the hydraulic line.

* * * * *